No. 722,413. PATENTED MAR. 10, 1903.
G. H. SHELLABERGER.
FRUIT HARVESTER.
APPLICATION FILED APR. 7, 1902.
NO MODEL. 2 SHEETS—SHEET 2.
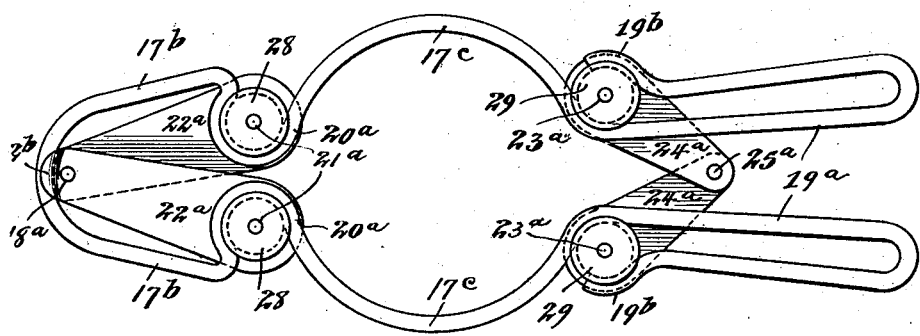
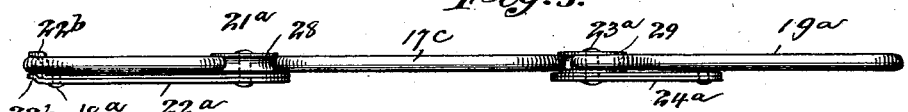
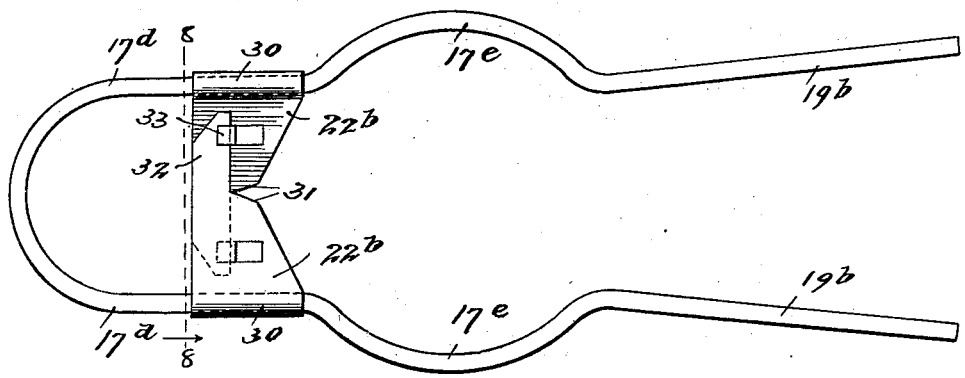
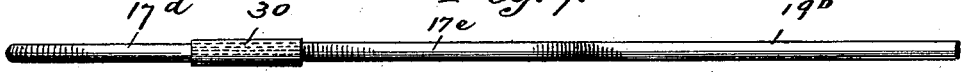
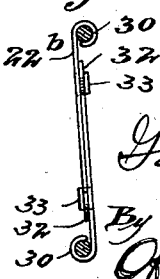

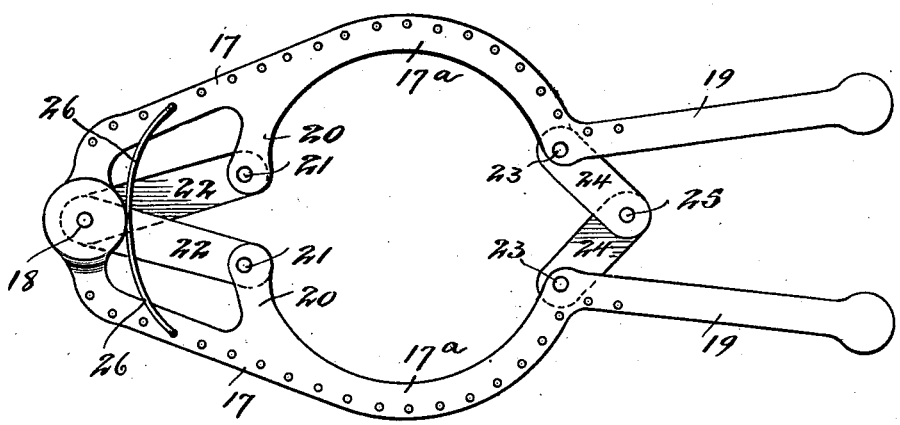
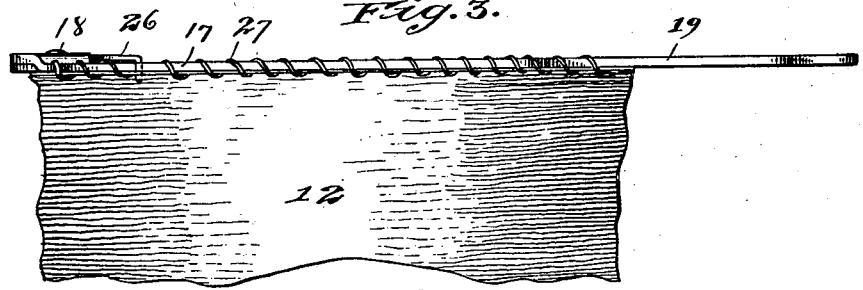
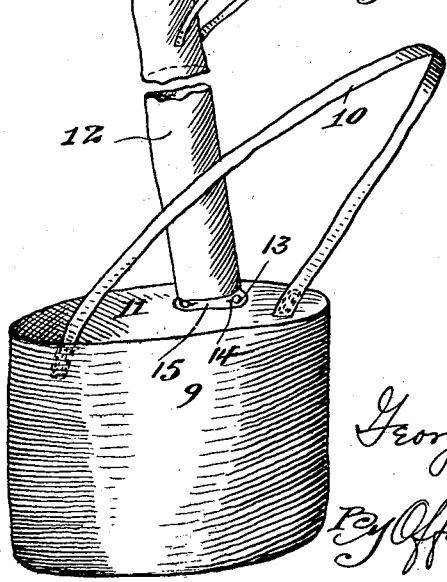

UNITED STATES PATENT OFFICE.

GEORGE H. SHELLABERGER, OF BARTOW, FLORIDA.

FRUIT-HARVESTER.

SPECIFICATION forming part of Letters Patent No. 722,413, dated March 10, 1903.

Application filed April 7, 1902. Serial No. 101,788. (No model.)

*To all whom it may concern:*

Be it known that I, GEORGE H. SHELLABERGER, a citizen of the United States, residing at Bartow, in the county of Polk and State of Florida, have invented certain new and useful Improvements in Fruit-Harvesters, of which the following is a specification.

My invention relates to devices for gathering and harvesting oranges, lemons, and other like fruits, and has reference more particularly to a device comprehending the functions both of a knife or clipper for separating the fruit from the branch or bough of the tree whereon it grows and of a guide and receptacle for temporarily receiving the severed fruit and automatically insuring its deposit and retention without the injury that would result thereto from allowing it to fall directly to the ground.

The principal object of my invention is to provide a device of the character specified which shall enable the fruit to be clipped and gathered with the greatest ease and in the most rapid manner by the operator, and a leading characteristic of my invention resides in the fact that its use dispenses entirely with the necessity on the part of the picker of holding the fruit with one hand against falling while severing it with the other.

Another important characteristic of the invention resides in the fact that it practically extends the reach of the picker, enabling him from a given foothold to reach and gather fruit that with the implements now in use and their manner of manipulation would be out of reach.

Still another valuable characteristic of the invention in its preferred form resides in its capability to sever the fruit by either a thrusting or pulling movement on the part of the picker.

Other minor objects and advantages of the invention will appear later in the following description thereof.

To these ends my invention consists in a fruit-harvesting device having the double capacity of severing the fruit and depositing the same in a temporary receptacle without injury and possessing the characteristics of structure and mode of manipulation substantially as hereinafter described, and more particularly defined in the claims.

In the accompanying drawings, Figure 1 is a side elevational view in perspective of a complete apparatus embodying my invention. Fig. 2 is a top plan view of that element of the device which constitutes the knife or clipper, the latter being herein shown as a double clipper, equipped with cutters at both ends thereof. Fig. 3 is a side elevational view of the top portion of Fig. 1, illustrating the clipper and the manner of connecting the underlying flexible fruit guide or chute thereto. Figs. 4 and 5 are plan and side elevational views, respectively, of a modified form of double clipper. Figs. 6 and 7 are similar views of a still further modification of the clipper, these views showing a clipper having but a single cutter; and Fig. 8 is a transverse sectional view on the line 8 8 of Fig. 6 looking in the direction of the arrow.

Referring to the drawings, and more particularly to Fig. 1, 9 designates a sack or bag, which may be of any desired capacity and which is designed to serve as a temporary receptacle for the fruit as it is severed from the tree. This sack is provided with a strap 10 of a suitable length to enable the sack to be suspended by said strap over the shoulders of the operator and occupies a position about opposite the waist of the latter. The sack 9 has an open upper end, as shown at 11, and to the inner surface of the side wall of the sack, near its upper end, is attached a flexible tube-like chute or guide 12, the lower end of which is removably secured to said sack in any suitable manner, the means herein shown consisting of a series of buttons 13 on the sack, coöperating with a corresponding series of buttonholes 14, formed in a depending flap 15, attached to the lower extremity of the chute 12. The sack 9 and chute 12 may be made of any suitable material whatever; but in practice I prefer to make them of a heavy cloth, such as canvas, the sack 9 being provided, if desired, with a light frame to make the same retain its general bucket or basket like form. To the chute 12 is applied a strap 16, similar in all respects to the strap 10 and of a size sufficient to pass freely over the arm of the operator and allow the chute to lie suspended a slight distance therebelow. To the upper end of the chute 12 is secured the clipper or picking device proper. As shown in Figs. 2 and 3, which illustrate my preferred form of this device, this clipper comprises a pair of symmetrically-formed shear-supports 17, which are pivotally united at their forward ends by a pivot screw or bolt 18 and at their rear ends are provided with handles 19. The intermediate portions of these shear-supports are outwardly or oppositely bowed or curved into substantially semicircular form, as shown at $17^a$, in order to provide between said shear-supports, at the intermediate portion thereof, a substantially circular opening of a size sufficient to freely admit the passage therethrough of the fruit—such as an orange, lemon, or the like—to be severed thereby from its supporting branch or twig. The opposite inner edges of the shear-supports 17 are further provided with integral inwardly-extending lugs or brackets 20, to the extremities of which are pivoted at 21 the corresponding inner ends of a pair of shear-blades 22, the opposite or outer ends of said blades being both pivoted on the pivot-pin 18 which unites the shear-supporting members 17. To the supporting members 17, at the junctions of the curved portions thereof with the handles 19, are similarly pivoted at 23 the corresponding inner ends of another pair of shear-blades 24, the opposite or outer ends of which blades are pivoted together, as indicated at 25. A bow-spring 26 has its opposite ends secured in the respective supporting members 17 a slight distance in rear of the pivot 18, said spring overlying the shear-blades 22 and by its expanding tendency serving to normally separate the shear-supports, and thereby open the shear-blades 22 and 24, carried thereby. The clipper thus constituted may be secured to the upper end of the flexible chute 12 in any suitable manner and by any suitable means. I have herein shown these parts as united by a cord 27, threaded through the upper margin of the flexible chute and through a series of holes formed through the shear-supports 17, around the outer edges or margins thereof, from the pivot 18 back to and slightly back of the points of connection of the shears 24 therewith. It is obvious, however, that numerous other and mechanically-equivalent means of uniting the clipper to the upper or receiving end of the chute might be employed, and my invention is therefore not limited to the particular connecting means herein shown and described.

The device is manipulated in the following manner: The parts being assembled and united as illustrated in Figs. 1 and 3, the operator suspends the sack 9 by passing the strap 10 over his shoulders, at the same time passing his hand and forearm through the chute-strap 16, whereby the chute is loosely and flexibly suspended below his forearm. The handles 19 of the clipper are then grasped by the hand and the clipper is moved about from place to place in any direction, according to the location of the oranges or other fruit to be picked, it being understood that the chute 12 is formed of a length sufficient to easily accommodate the longest reach of which the operator is capable, while the material of which it is composed will possess sufficient flexibility to enable the clipper to be freely shifted about in any direction relatively to the underlying receptacle 9. In applying the clipper to the fruit it is passed up over the fruit from below the same, the fruit lying within and below the central substantially semicircular opening formed by the two outwardly and oppositely curved intermediate portions of the shear-supports. The operator then moves the clipper either toward or away from himself to bring the stem of the fruit between either the shears 22 or the shears 24, whereupon by applying a closing pressure of the hand to the handles 19 the stem is severed and the fruit falls downwardly through the chute 12 and comes to rest within the receptacle 9. This operation is continued until the receptacle or the receptacle and chute have been filled with the fruit, whereupon the operator descends from the tree, empties the receptacle and chute, and then proceeds to refill the same in the manner already described. Where in reaching for the fruit the same can be gathered more conveniently and easily by an outward thrust, the shears 24 are effective to sever the stem, while where an extended reach is required for any particular specimen the latter can be more conveniently detached and gathered by the operator by applying the clipper over the fruit and then drawing the same toward himself, in which operation the shears 22 will effect the severance of the fruit from its support on the tree.

Figs. 4 and 5 illustrate a slightly-modified form of my invention, wherein the shear-supports instead of being made in a pair of rigid pivoted sections are constituted by a single length of spring-wire bent in such a form as to present a pair of companion shear-supports $17^b$, having the opposite outwardly curved or bowed intermediate portions $17^c$ and otherwise substantially the same characteristics of form and function as the shear-supports 17 already described. For convenience in mounting and supporting the inner ends of the shear-blades (designated by $22^a$ and $24^a$) the wire has a pair of oppositely-disposed inwardly-bent loops, (designated by $20^a$,) corresponding in function and relative location to the lugs or brackets 20 and constituting holders for a pair of peripherally-grooved disks 28, which snugly seat and are contained within said loops and have pivoted centrally thereto by pivot-pins $21^a$ the inner divergent ends of the shear-blades $22^a$, the opposite ends of which blades are pivotally joined by a pin $18^a$ and have upper and lower lips $22^b$, (see Fig. 5,) which embrace the closed end of the shear-supporting frame. The inner divergent ends of the shear-blades $24^a$ are similarly supported on pivot-pins $23^a$, mounted centrally in peripherally-grooved disks 29, which are fixedly secured in place by doubling and bending back the handle portions 19ª in such a manner as to grip the disks 29 at opposite points on the peripheries thereof between the extreme ends 19ᵇ of the backwardly-bent handle extensions and the opposite curved portions of the wire frame located at the junctions of the handles 19ª with the circular or mouth portion 17ᶜ of the clipper. The outer or connected ends of the shear-blades 24 are united by a pivot-pin 25ª, lying centrally between the handles 19ª. The operation of this form of clipper is identical with the already-described operation of the form shown in Figs. 1, 2, and 3, and hence it need only be remarked that the form last described is designed simply as a more economical and cheaply-constructed substitute for the preferred form of Fig. 2. The wire may be readily bent to the form shown in Fig. 4 to constitute a simple and efficient support for the shear-blades, while its inherent elasticity dispenses with the necessity of forming the support in two pivoted sections normally distended by a separate spring.

In Figs. 6, 7, and 8 I have illustrated a still simpler and more elementary form in which my invention may be embodied, this form also lending itself to still further economy and cheapness of the device. In this form, as in Figs. 4 and 5, the shear support or frame is constituted by a single strip of elastic wire bent into a generally U shape to present a pair of integrally-connected shear-supports 17ᵈ, which have the outwardly and oppositely curved or bent intermediate mouth portions 17ᵉ and the straight and outwardly-divergent handle portions 19ᵇ. In this case the shear-blades (designated by 22ᵇ) may each be formed of a strip of thin flat sheet metal having its heel end 30 bent and curled around the supporting-frame just in advance of the intermediate bow 17ᵉ thereof, the inwardly-extending ends of said strip being narrowed and provided each with a shear edge 31 and an overlapping extension 32. In order to form on each strip a keeper and guide for the overlapping extension of the other companion strip, I cut and bend up from the body of each strip an integral tongue 33, which overlies the inner edge of the extension 32, thus forming a guide and keeper for the latter, while permitting the meeting movement of the strips necessary to effect the shearing action thereof upon the contraction of the handles 19ᵇ. I have shown this form of shears applied only to one end of the shear-supporting frame; but it is obvious that a replica of the same might be applied to the other end of the frame, either in place of or in addition to the shears shown and described.

It will be observed that any of the several forms of shear-supporting frames herein illustrated and described, when associated with shear-blades in the manner illustrated in Figs. 1 to 5, inclusive, is readily adapted to the use of knives or blades having double cutting edges. In Fig. 2, for instance, the blades 22 and 24 may have cutting edges on both margins thereof, and when the inner coöperating cutting edges become dull it is necessary only to exchange the inner pivotal connections of the two blades of each pair of shears, respectively, in order to secure, in effect, a new and sharp pair of cutters. When both edges of each blade have become dull, the blades may be readily removed, resharpened, and reapplied to the holders.

I have illustrated and described several interchangeable and mechanically-equivalent forms of clipper, all of which are equally well adapted to coöperate with the fruit-receptacle and its flexible chute adapted to be carried and supported on the shoulders and arm of the operator, and I desire it to be understood that my invention in its generic aspect resides in the combination, with the receptacle and guide-chute adapted to be carried by the operator, of a clipper or cutter adapted for coöperation with the open upper end or mouth of the guide-chute, irrespective of the particular form and structure of the clipper or cutter itself. To the extent indicated in certain of the appended claims, however, my invention more specifically resides also in certain features of construction of the clipper or cutter whereby the same is rendered specially adapted for coöperation with the underlying devices wherein the fruit is disposed of and cared for subsequent to its severance from the tree by the action of the clipper itself.

I claim—

1. A fruit-harvesting appliance, comprising in combination a receptacle, a strap secured at its ends to said receptacle and adapted to be passed over the shoulders of the operator, a flexible delivery-chute removably connected at its lower end with said receptacle, a strap connected to said chute and adapted to be passed over the operating-arm of the operator, and a clipper connected with the upper end of said delivery-chute, substantially as described.

2. In a fruit-harvesting appliance, the combination with a receptacle adapted to be supported by the body of the operator and a flexible delivery-chute communicating therewith, of a clipper comprising a pair of outwardly-bowed distensible and compressible shear-supporting members attached to the upper margin of the delivery-chute, and a pair of shear-blades carried and operated by said supporting members, substantially as described.

3. In a fruit-harvesting appliance, the combination with a receptacle adapted to be supported by the body of the operator and a flexible delivery-chute communicating therewith, of a clipper comprising a pair of distensible and compressible shear-supporting members outwardly and oppositely bowed at their intermediate portions to pass over the fruit to be severed and provided with a pair of handles, a pair of shear-blades carried and operated by said supporting members at one end of their outwardly-bowed portions, and means uniting said shear-supporting members to the upper margin of the delivery-chute, substantially as described.

4. In a fruit-harvesting appliance, the combination with a receptacle adapted to be supported by the body of the operator and a flexible delivery-chute communicating therewith, of a clipper adapted to be secured to the upper margin of the delivery-chute and comprising a pair of shear-supporting members pivotally united at one end and provided with intermediate outwardly-bowed portions, and with handles at their other ends, a pair of shears supported and operated at either end of the intermediate bowed portions of the shear-supports, and a spring normally tending to distend said shear-supports and their contained pairs of shears, substantially as described.

GEORGE H. SHELLABERGER.

Witnesses:
A. G. KENNEDY,
MARGARET WILTBERGER.